United States Patent
Hunter

(10) Patent No.: US 6,252,884 B1
(45) Date of Patent: Jun. 26, 2001

(54) DYNAMIC CONFIGURATION OF WIRELESS NETWORKS

(75) Inventor: Wesley G. Hunter, Doraville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/045,263

(22) Filed: Mar. 20, 1998

(51) Int. Cl.$^7$ .................................................. H04B 7/212
(52) U.S. Cl. ............................................ 370/443; 370/552
(58) Field of Search .................................. 370/552, 443, 370/400, 410, 426, 522, 377, 373, 374, 378, 384, 329, 348, 349, 335, 395, 232, 230, 524, 401, 338; 455/522

(56) References Cited

U.S. PATENT DOCUMENTS

| | | | |
|---|---|---|---|
| 5,088,094 | * 2/1992 | Grauel et al. | 370/443 |
| 5,732,360 | * 3/1998 | Jarett et al. | 455/552 |
| 5,737,319 | * 4/1998 | Croslin et al. | 370/255 |
| 6,034,966 | * 3/2000 | Ota | 370/443 |
| 6,049,535 | * 4/2000 | Ozukturk et al. | 370/335 |

* cited by examiner

Primary Examiner—Wellington Chin
Assistant Examiner—Premell Jones
(74) Attorney, Agent, or Firm—Needle & Rosenberg, P.C.

(57) ABSTRACT

The present invention is directed to a system and process for automatically and dynamically configuring a wireless computer network. Each computer that is to participate in the dynamic network continuously broadcasts its address to any other computer within range of the wireless network hardware. When a computer receives a broadcast message from a machine it is not currently connected to, it can then use any standard communications protocol (i.e., TCP/IP) to establish a connection to the broadcasting machine. Once the connection is established, a message is sent to the broadcasting machine notifying it of the new connection. This allows for either client/server, peer-to-peer, or other communications strategies to be implemented, depending on the application. Upon establishing a new connection between a pair of computers, a data synchronization protocol is employed to exchange data, applications, or configure services. To avoid having many disconnects, reconnects, and data synchronizations happening, a connection degradation strategy is used.

14 Claims, 5 Drawing Sheets

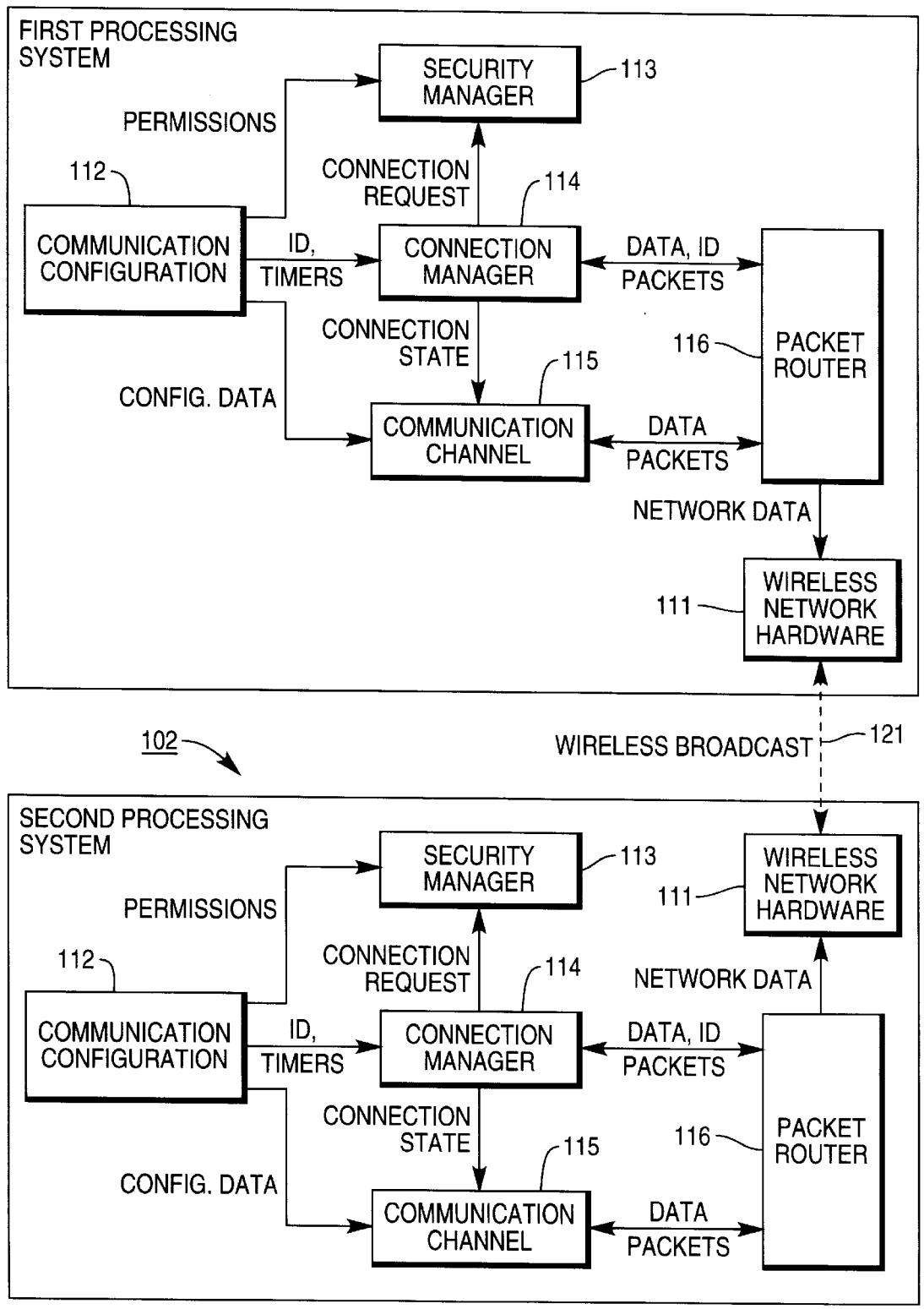

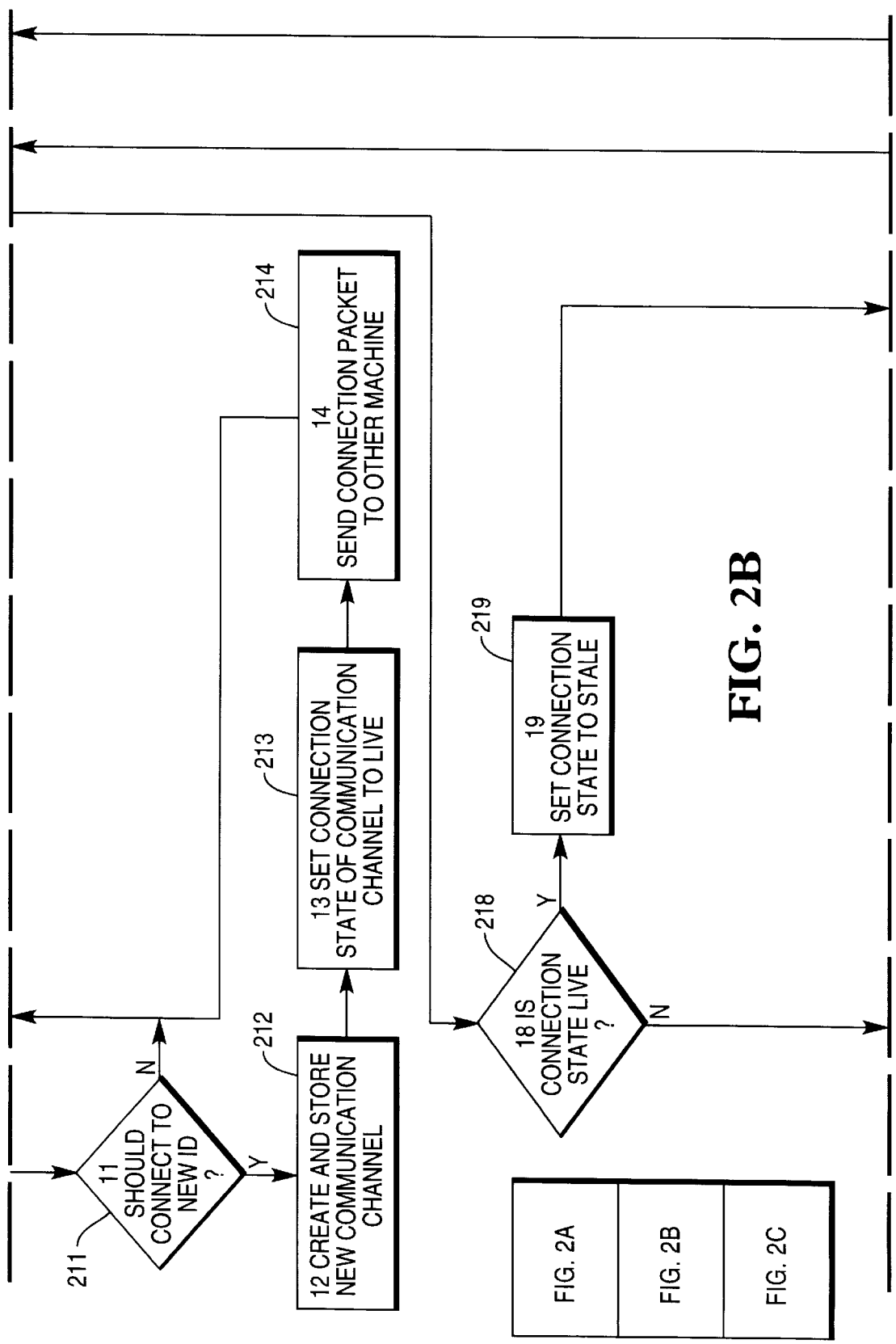

DYNAMIC CONFIGURATION OF WIRELESS NETWORKS

BACKGROUND OF THE INVENTION

1. Field of the Invention

The present invention relates to the management of computer devices within a wireless network, where the computer devices are apt to appear and disappear on a regular basis.

2. Description of the Prior Art

Wireless networks connecting computer devices are a necessary component of distributed, collaborative, and portable applications. However wireless networks pose a unique set of software problems to be solved. Traditional wired networks are relatively static. When a new computer or branch of the network is added, it can be assumed that it will exist for a lengthy period of time. In a dynamic, volatile user environment such as emergency medical care, people and computer components can be arriving and departing on a minute by minute basis. If the computer components are running applications that wish to share data, or if the computers wish to share applications themselves, it is necessary to automatically manage the appearance and disappearance of network connections.

Unfortunately, existing networking methodologies are primarily designed to assume that the various computer devices are static—e.g., that they will always be in range and connected to the network. Of course, this may not always be the case, especially in certain applications. For example, with respect to the emergency medical care environment mentioned previously, medical technicians and medical vehicles may each be outfitted with computer devices for collecting and sharing medical information, etc. Because such computer devices may be brought into use with each other in a dynamic fashion, it cannot be assumed that any of these devices will be present, nor in any specific configuration. Therefore, prior art wireless network maintenance systems are simply unsuited to such environments.

There is therefore a significant need in the art for a system for dynamically managing a wireless network of computer devices, so as to ensure that each device will properly be connected to the network.

SUMMARY OF THE INVENTION

In the present invention, each computer that is to participate in the dynamic network continuously broadcasts its address to any other computer within range of the wireless network hardware. To minimize the overhead on the available communications bandwidth, this broadcast only contains a number identifying this message as an address broadcast and another number representing the address of the sending machine. This message must be sent as often as the network is expected to change (for example, once per minute for a highly dynamic network).

When a computer receives a broadcast message from a machine it is not currently connected to, it can then use any standard communications protocol (i.e., TCP/IP) to establish a connection to the broadcasting machine. Depending on the application requirements, a set of rules might be consulted to decide whether to connect to a particular machine or not. Once the connection is established, a message is sent to the broadcasting machine notifying it of the new connection. This allows for either client/server, peer-to-peer, or other communications strategies to be implemented, depending on the application.

Upon establishing a new connection between a pair of computers, a data synchronization protocol is employed to exchange data, applications, or configure services. Each machine in the newly connected pair sends a set of messages to the other. Each of these messages contains an identifier for the data object, application, or service the computer can supply along with the status of the data object, application, or service (the status could be the last date and time a particular data object was updated, for example). When a machine receives a data synchronization message, it can look at the identifier and status to decide whether to send a request to its partner machine. For example, if it notices that a data object it has interest in has a more recent update time stamp, it can request a new copy of the data object. The number and type of data synchronization messages and the response to those messages can vary to satisfy specific application requirements.

In a mobile environment, it is likely that a computer could move out of communication contact for a brief time (seconds or minutes) and then come back into range. To avoid having many disconnects, reconnects, and data synchronizations happening, a connection degradation strategy is used. When a connection is first established or when any data is received from a connection (including a broadcast message), that connection is marked as LIVE. At regular timed intervals, all the connections a machine has are downgraded one level. From LIVE, a connection moves to STALE; from STALE, to DEAD; and from DEAD, to DISCONNECTED. The amount of time between downgrades should be closely tied to the broadcast message rate. A simple implementation is to downgrade before each broadcast, if it can be assumed that each machine participating in the dynamic network is broadcasting at the same rate. If an application attempts to send data on a connection that is any state other than LIVE, the data is queued up and not transmitted. As soon as the connection becomes LIVE again, any queued data can be sent according to any scheduling rules that are in place. Once a connection has reached the DISCONNECTED state, any termination required by the underlying communications protocol can be done. No data can be sent to or received from the machine at the other end of a DISCONNECTED connection until a broadcast message has caused a reconnect and data synchronization to happen.

BRIEF DESCRIPTION OF THE DRAWINGS

FIG. 1 is a block diagram depicting one instantiation of a dynamic network of the present invention.

DETAILED DESCRIPTION OF THE INVENTION

Figure 2A:
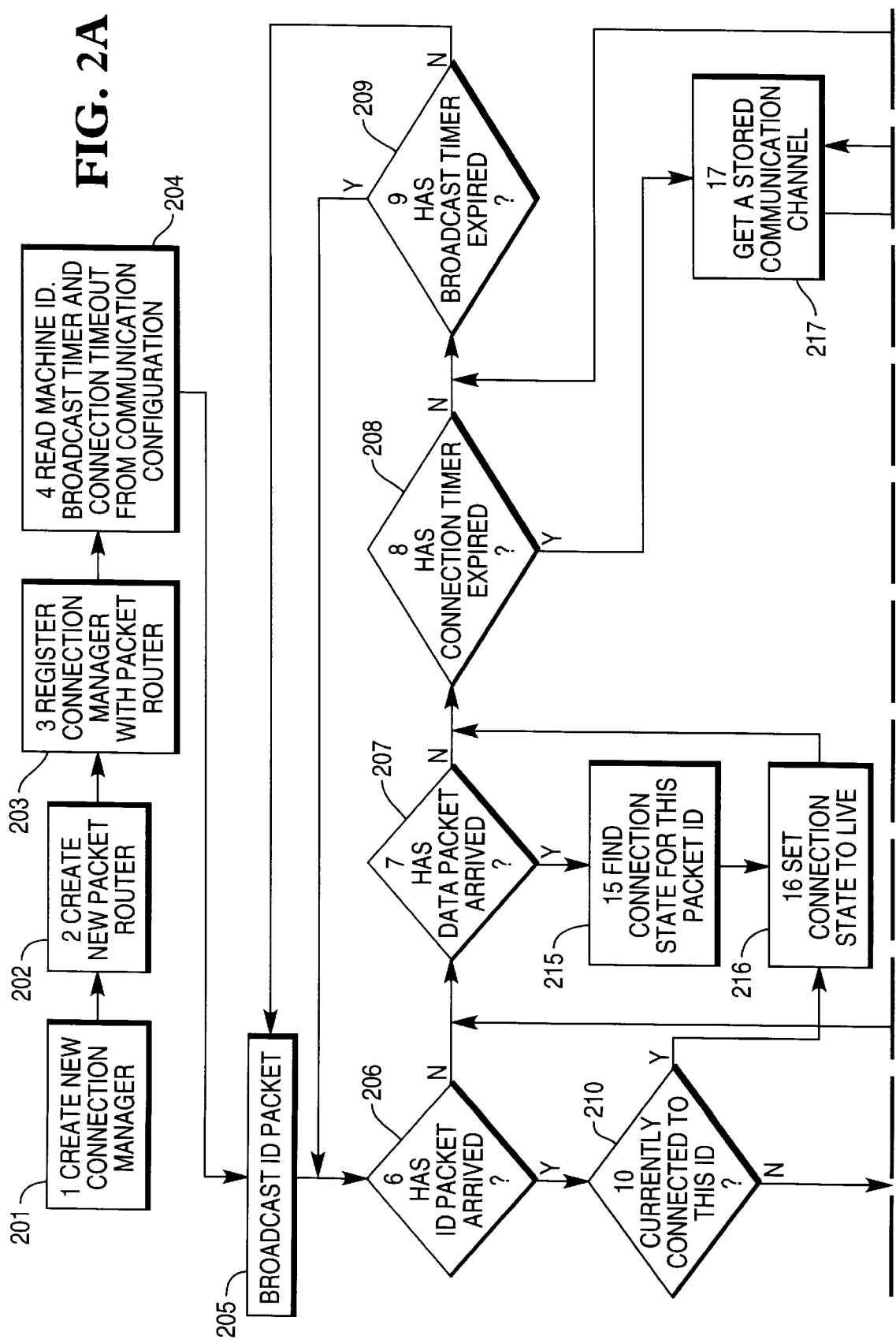
FIG. 2 is a diagram depicting the process performed by the system of FIG. 1.

A preferred embodiment of the invention is now described in detail. Referring to the drawings, like numbers indicate like parts throughout the views.

FIG. 1 is a block diagram depicting one instantiation of a dynamic network of the present invention, linking a first processing system 101 to a second processing system 102 via wireless radio frequency (RF) connection 121. Each processing system may consist of a hardware module called Wireless Network Hardware 111 and the software modules/objects called Communication Configuration 112, Security Manager 113, Connection Manager 114, Communication Channel 115, and Packet Router 116.

The Connection Manager 114 is the main software module controlling the dynamic network. It is responsible for monitoring incoming network data packets, detecting new processing systems on the network, creating new communication channels within the wireless broadcast 121, detecting when processing systems leave the network, and closing communication channels. There is one Connection Manager 114 running on each processing system 101, 102, etc.

The Security Manager 113 controls which processing systems are allowed to connect and which data is allowed to be accessed by these processing systems. There is one Security Manager 113 running on each processing system.

A Communication Channel module 115 is used to send application data from one processing system to another processing system (e.g., from system 101 to system 102) via the wireless network 121. It is responsible for ensuring data delivery in the proper sequence without error. There can be many Communication Channel modules 115 on each processing system.

The Packet Router 116 receives data from the Wireless Network Hardware 111 and forwards it to other software modules that have registered for the data. It understands the format of application data packages and constructs these packets by reading network data bytes from the Wireless Network Hardware 111. One Packet Router 116 is running in each processing system.

The Communication Configuration module 112 allows users to edit and store parameters that control the actions taken by the other software modules. For this portion of the dynamic network, valid parameters include processing system identification, connection and data transmission permissions, broadcast and connection degradation timeout values, and any configuration parameters needed for a communication channel. There is also one Communication Configuration module 112 on each processing system.

The Wireless Network Hardware 111 is the interface between processing systems (via wireless RF broadcast 121). In one embodiment, hardware 111 may comprise a WaveLAN system, available from AT&T, but may also be implemented with cellular phones and modems, PCS systems, satellite telephones, CB radios, or any other wireless communication system.

Figure 2C:
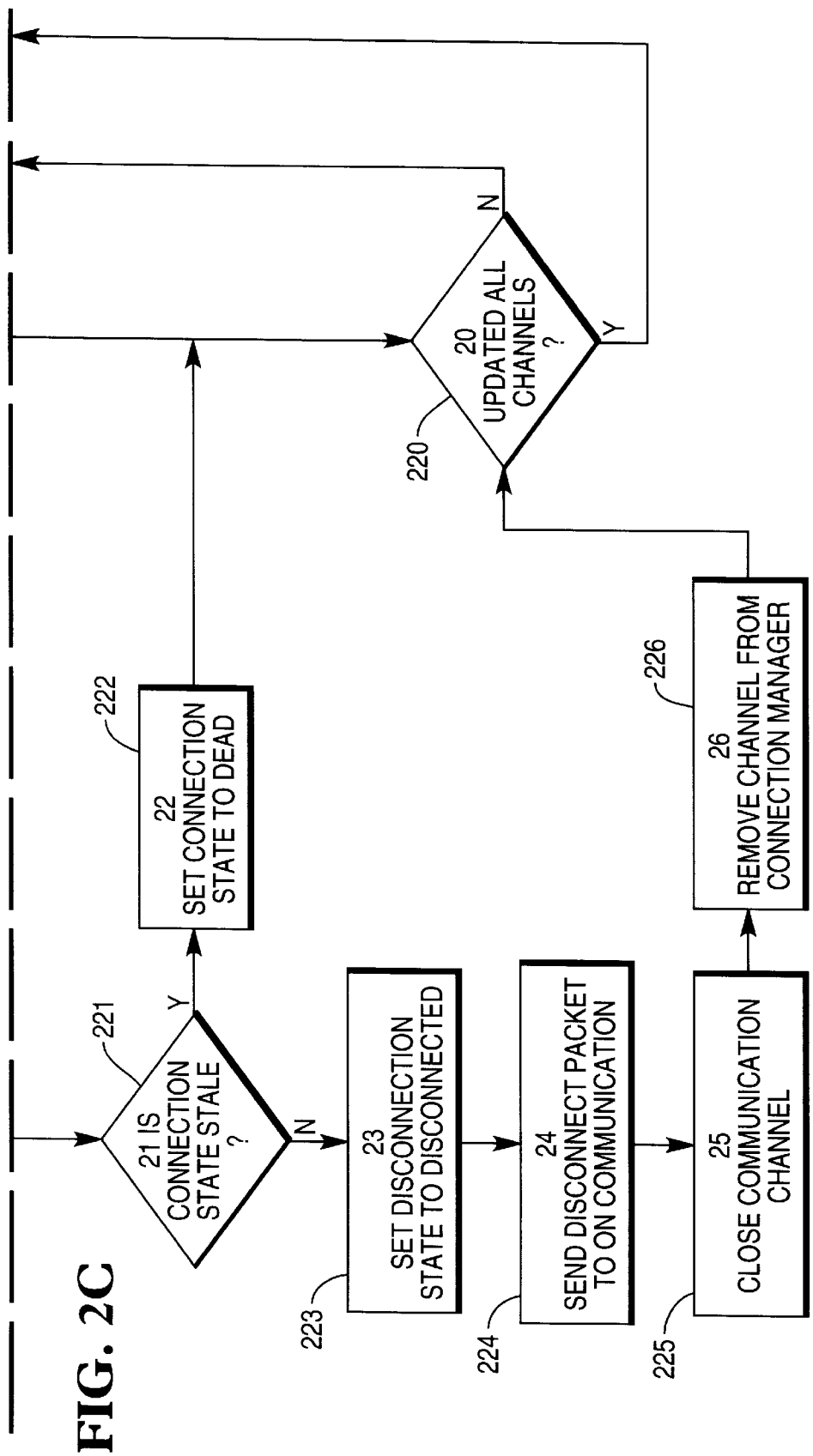

FIG. 2 depicts the flow of control for the dynamic network configuration of FIG. 1. In a preferred embodiment, the process of FIG. 2, as well as the processes performed by software modules/objects 112–116, may be programmed for IBM-compatible PCs operating under the Windows environment, available from Microsoft Corporation, or equivalent. Other suitable environments include Unix, Macintosh, or any other programming environment.

In summary, steps 201–204 are initialization steps. Steps 205–209 form the main processing loop for the Connection Manager 114. In steps 210–214, the Connection Manager 114 responds to connection requests coming from other processing systems. (received via wireless connection 121 through the Wireless Network Hardware 111). Steps 215–226 form the basis for detecting when a processing system has left the network. 7569

FIG. 2 will now be described in further detail. In steps 201–204, when each processing system is started, it first creates a new Connection Manager 114 and a new Packet Router 116. For example, if Smalltalk is used as a programming language, the message new is sent to the ConnectionManager class and the result saved in a variable for future reference. In C++, the new operator would be invoked for the ConnectionManager class and the result saved in a variable. In C, the malloc( ) function would be used to allocate a ConnectionManager data structure and the result saved in a variable.

The Connection Manager 114 then informs the Packet Router 116 that it wants to receive all data packets that arrive from wireless connection 121 via the Wireless Network Hardware 111. The Packet Router 116 stores this request in a suitable internal table. The Connection Manager 114 also reads and stores the identifier for this processing system from the Communication Configuration 112. It also reads values for the broadcast timer and the connection degradation timer and starts these two timers running. In one embodiment, these timers may be implemented by using standard Microsoft Windows functions to create and start operating system timers that send periodic messages to the software modules/objects.

In step 205, the Connection Manager 114 creates a network data packet containing the identifier for this processing system and sends it to the Packet Router 116, instructing the Packet Router 116 to broadcast the packet through the Wireless Network Hardware 111 and connection 121 to all other processing systems within transmission range.

Figure 3:
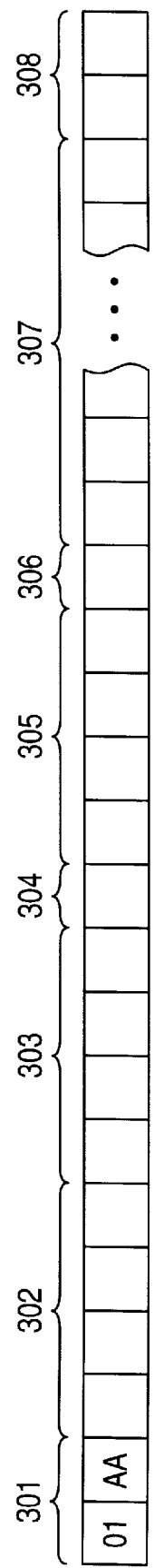
FIG. 3 is a diagram depicting an example of the format of a data packet that may be transmitted between the processing systems of FIG. 1.

In one embodiment, all network data packets 300 may consist of a series of bytes in a common format, as depicted in FIG. 3. For example, the first two bytes 301 may always be the number 01 followed by the number AA (base 16). These two bytes identify the start of a data packet 300. The next four bytes 302 represent the integer identifier of the sending processing system. These four bytes are ordered with the most significant byte of the identifier first and the least significant byte last. Then follow four bytes 303 in the same order representing the integer identifier of the receiving processing system. Next is a single byte 304 encoding the packet sequence number.

Each Communication Channel between two processing systems maintains a Current Packet Sequence Number that can be used to reorder the network packets into their proper sequence if intermediary network hardware or software either lost or delivered packets out of the intended order. The Current Packet Sequence Number is incremented and stored at 304 in each packet 300 before it is transmitted. Once the value exceeds the maximum integer that can be stored in a single byte (255), it is reset to 0.

Following the sequence number are four bytes 305 that store an integer representing the size of the entire network packet 300. These four bytes are ordered with the most significant byte of the size first and the least significant byte last. Then follows a single byte 306 that identifies the message being sent from one processing system to another. For example, a value of 1 indicates that the packet is an identification packet, a value of 2 for a connection packet, a value of 3 for a data received packet, a value of 4 for an error packet, and values of 5 and higher for application specific data.

After the message ID byte 306 are a set of data bytes 307. The number of data bytes and their meaning is dependent on the message ID byte 306. An identification packet has no data bytes 307 since the processing system identification is already encoded in the network packet. A connection packet would also have no data bytes 307 since that is needed to be known is that a connection occurred. An error packet could have one data byte 307 that indicated what error occurred. The last two bytes 308 in the network packet are checksum bytes.

Before the packet 300 is transmitted, all the bytes in the packet (excluding the two checksum bytes) are added together and the result truncated to fit into two bytes. The resulting truncated sum is stored, most significant byte followed by least significant byte, at the end 308 of the network packet. These two bytes 308 are used to detect errors in the data transmission. The receiving processing system computes the checksum for the bytes it received and compares it to the transmitted checksum 308 generated by the sending processing system. If the two values match, no error has presumably occurred.

In steps 206–209, the Connection Manager 114 then waits for either a network packet to come in from the Packet Router 116 or for one of the timers to trigger. This loop repeats until the processing system is shut down and the Connection Manager 114 is destroyed. If the identification timer triggers (step 209), the processing system repeats the broadcast of the identification packet (step 205), restarts the timer, and continues looping. Otherwise, it continues waiting for timers or packets.

In step 210, if an identification packet has arrived (step 206), the respective processing system knows that another processing system is present on the network. The Communication Channel Module 115 looks at the identifier in this packet and tries to find an active communication channel (one whose Connection State is anything but DISCONNECTED) for the identifier. These flags may be represented as integers (for example, 0=LIVE, 1=STALE, 2=DEAD, 3=DISCONNECTED) and may be stored in a variable maintained by the Communication Channel object. If an active channel already exists, its Connection State is updated to LIVE (Step 216) and the Connection Manager 114 continues to wait for another packet or timer (step 208). Since all processing systems are repeatedly broadcasting identification packets, this will serve to keep a channel alive even if it is not being used to carry application data.

In step 211, if no active communication channel is found for the incoming identifier, the Security Manager 113 is consulted to see if a new channel is allowed. The Security Manager 113 reads configuration information that the user stored via, for example, a user interface into the Communication Configuration 112. If it is not permitted, the Connection Manager 114 continues to wait for another packet or timer (step 207).

In steps 212–214, if the Security Manager 113 allows a new channel to be created, the Connection Manager 114 creates and stores a new Communication Channel 115. A new Communication Channel 115 is created in the same manner as the Connection Manager 114 (depending on the programming language used). The Connection Manager 114 may have a variable that lists all the communication channels. The new channel is given the incoming identifier and has its Connection State set to LIVE (step 213). Once this is done, a connection packet is constructed (discussed previously) and sent to the Packet Router 116 with instructions to send the packet to the processing system via wireless broadcast 121 that sent the incoming identification packet (step 214). This connection packet notifies the other processing system that the present processing system has accepted its request for a connection and can be used to initiate application-specific data synchronization (corresponding to the particular application of the present invention). The Connection Manager 114 then continues to wait for packets or timers (step 207).

In steps 215–216, if a data packet comes to the Connection Manager 114 from the Packet Router 116, the Connection Manager 114 finds the Communication Channel over which the packet arrived and sets the Connection State of the that channel to LIVE. This keeps channels alive as long as they are being used to carry application data. After the Connection State is updated, the Connection Manager 114 continues to wait for other packets or timers (step 208).

In steps 217–226, once the connection degradation timer triggers (step 208), the Connection Manager 114 loops through all the stored Communication Channels and lowers their Connection State. For example, in Microsoft Windows, the operating system calls a function in a software object of the present invention when the timer triggers. If the channel's Connection State is LIVE, it is demoted to STALE. If it is STALE, it is demoted to DEAD. If it is DEAD, it is set to DISCONNECTED, a disconnect packet is constructed and sent through the Packet Router 116 to the other processing system, the channel is closed, and the channel is removed from the list stored in the Connection Manager 114 (steps 223–226). Note that when the Connection State reaches DISCONNECTED, it is unlikely that the disconnect packet can be sent through the channel since the other processing system is most likely out of communication range. Any application data given to a Communication Channel whose state is other than LIVE should be stored and not sent to the Packet Router 116. When the channel's state is upgraded to LIVE, this stored data can then be sent through the Packet Router 116.

The previous set of steps are the key to the dynamic network. It allows a processing system to temporarily disappear from and reappear on the network (by moving behind a steel wall or slightly out of range, for example) without closing the communication channel. If processing systems are sharing data in a shared peer-to-peer configuration or if some processing systems are acting as servers for others, establishing a connection between processing systems could involve a high volume of data exchange. This algorithm minimizes the overhead associated in establishing, terminating, and re-establishing Communication Channels.

The present invention has been described with respect to one exemplary embodiment. Those having ordinary skill in the art will recognize that the present invention may be implemented in a variety of ways, while falling within the scope of the accompanying patent claims. For example, the present invention may be used with a variety of wireless communication systems and protocols, and could even be used with non-wireless communication networks. Moreover, while a specific process and data format have been disclosed, it will be readily apparent that other equivalent processes and formats may also be utilized.

What is claimed is:

1. In a dynamic data network for linking a first processing system to a second processing system over a communication medium, the first processing system comprising:
   (a) means for transmitting over the communication medium a first identification signal associated with the first processing system;
   (b) means for detecting a second identification signal received over the communication medium from the second processing system, whereby the second identification signal is transmitted by the second processing system in response to the receipt of the first identification signal by the second processing system;
   (c) means for transmitting over the communication medium to the second processing system a first connection signal, responsive to the detection of the second identification signal by the detecting means;
   (d) means for establishing a communication channel between the first processing system and the second processing system, responsive to the detection of a second connection signal transmitted from the second processing system, indicative of the second processing system's receipt of the first connection signal from the first processing system;

(e) means for storing an indication of a state of said communication channel, said state including an established state, a temporarily de-established state, and a permanently de-established state; and (f) means for storing information relating each communication channel in an established state to a detected identification signal.

2. The system of claim 1, wherein the communication medium is a wireless radio frequency connection.

3. The system of claim 1, wherein the system further comprises: means for temporarily de-establishing the communication channel between the first processing system and the second processing system, responsive to a disconnection of the first processing system and the second processing system over the communication medium.

4. The system of claim 3, wherein the system further comprises: means for re-establishing the communication channel between the first processing system and the second processing system if the first processing system and the second processing system remain disconnected for less than a pre-selected amount of time.

5. The system of claim 3, wherein the system further comprises: means for permanently de-establishing the communication channel between the first processing system and the second processing system if the first processing system and the second processing system remain disconnected for greater than a preselected amount of time.

6. A process for linking a first processing system to a second processing system over a communication medium in a dynamic data network, the process comprising the steps of:

(a) transmitting over the communication medium a first identification signal associated with the first processing system;

(b) detecting a second identification signal received over the communication medium from the second processing system, whereby the second identification signal is transmitted by the second processing system in response to the receipt of the first identification signal by the second processing system;

(c) transmitting over the communication medium to the second processing system a first connection signal, responsive to the detection of the second identification signal by the detecting means;

(d) establishing a data communication channel between the first processing system and the second processing system, responsive to the detection of a second connection signal transmitted from the second processing system, indicative of the second processing system's receipt of the first connection signal from the first processing system;

(e) storing an indication of a state of said data communication channel, said state including an established state, a temporarily de-established state, and a permanently de-established state, said indication set to indicate said established state in response to said establishing step (d); and (f) storing information relating each data communication channel in an established state to a detected identification signal.

7. The process of claim 6, further comprising the step of: temporarily de-establishing the communication channel between the first processing system and the second processing system, responsive to a disconnection of the first processing system and the second processing system over the communication medium.

8. The process of claim 7, further comprising the step of: re-establishing the communication channel between the first processing system and the second processing system if the first processing system and the second processing system remain disconnected for less than a pre-selected amount of time.

9. The process of claim 7, further comprising the step of: permanently de-establishing the communication channel between the first processing system and the second processing system if the first processing system and the second processing system remain disconnected for greater than a pre-selected amount of time.

10. A computer network comprising:

(a) a communication medium;

(b) a first processing system comprising:

(i) means for transmitting over the communication medium a first identification signal associated with the first processing system;

(ii) means for detecting a second identification signal received over the communication medium;

(iii) means for transmitting over the communication medium a first connection signal, responsive to the detection of the second identification signal by the detecting means;

(iv) means for establishing a data communication channel over the communication medium, responsive to the detection of a second connection signal over the communication medium;

(v) means for storing an indication of a state of said data communication channel, said state including an established state, a temporarily de-established state, and a permanently de-established state; and (vi) means for storing information relating each data communication channel in an established state to a detected identification signal; and (c) a second processing system comprising:

(i) means for transmitting over the communication medium a second identification signal associated with the second processing system;

(ii) means for detecting over the communication medium the first connection signal; and (iii) means for transmitting over the communication medium a second connection signal, responsive to the detection of the first connection signal by the detecting means.

11. The system of claim 10, wherein the communication medium is a wireless radio frequency connection.

12. The system of claim 10, wherein the system further comprises: means for temporarily de-establishing the communication channel between the first processing system and the second processing system, responsive to a disconnection of the first processing system and the second processing system over the communication medium.

13. The system of claim 12, wherein the system further comprises: means for re-establishing the communication channel between the first processing system and the second processing system if the first processing system and the second processing system remain disconnected for less than a pre-selected amount of time.

14. The system of claim 12, wherein the system further comprises: means for permanently de-establishing the communication channel between the first processing system and the second processing system if the first processing system and the second processing system remain disconnected for greater than a preselected amount of time.

* * * * *